United States Patent Office 3,055,272
Patented Sept. 25, 1962

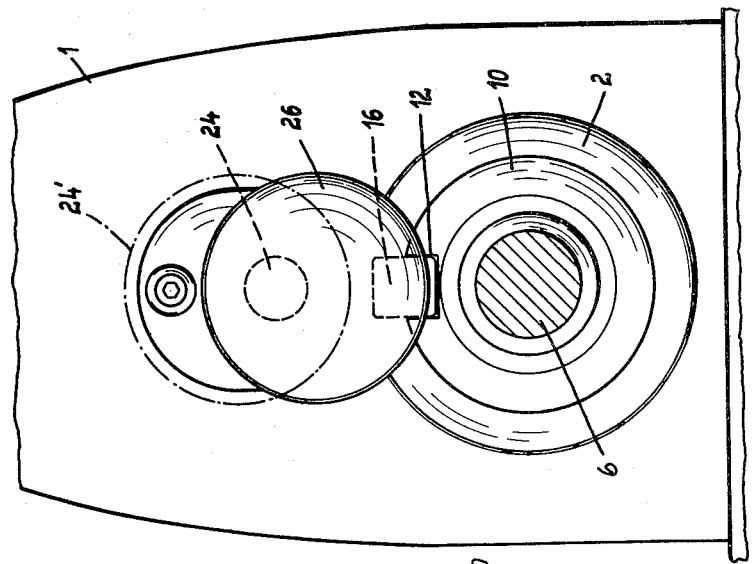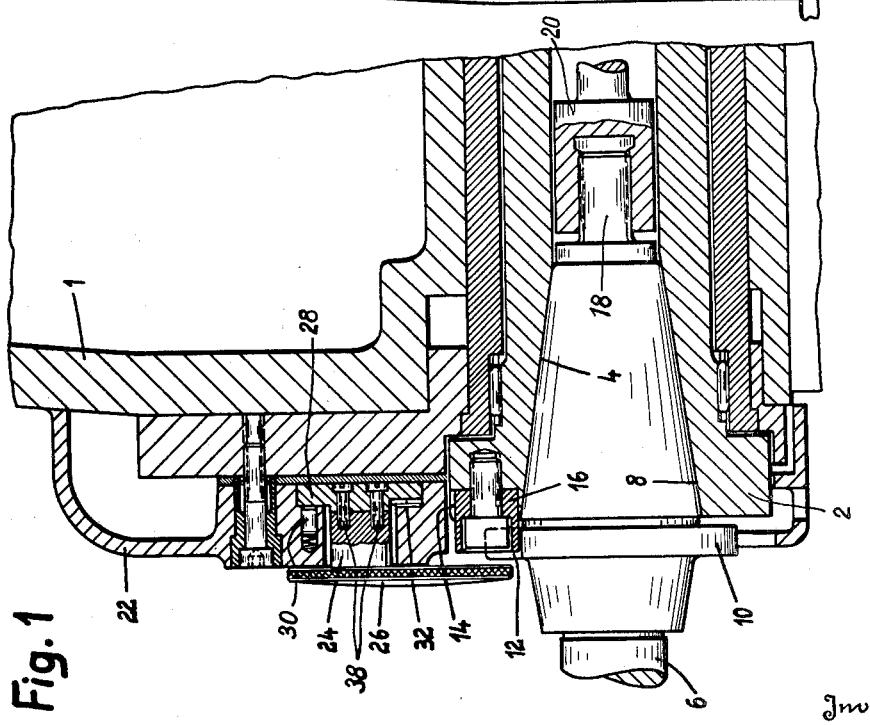

3,055,272
MACHINE TOOLS
Kurt Zwick, Munich, Germany, assignor to Hans Deckel, Munich, Germany, and Friedrich Wilhelm Deckel, Zug, Switzerland
Filed Nov. 16, 1959, Ser. No. 853,339
Claims priority, application Germany Nov. 29, 1958
3 Claims. (Cl. 90—11)

The present invention relates to a device for machine tools by means of which the interchange of mandrels and similar tool holders to be fixed or secured within the machine tool spindle by the use of a draw rod, is not only greatly facilitated and accelerated, but is also rendered feasible, in the case of larger machines, without the use of auxiliary personnel or auxiliary accessories.

For the purpose of centering the mandrels with respect to the spindle, the prior art mandrels are normally tapered along the outer surface thereof so as to fit into internal complementary taper provided within the spindle. A thread is thereby ordinarily arranged centrally and at the rear end of the mandrel for purposes of providing a screw-threaded connection with the draw rod whose tensional or pulling force causes the tapered mandrel to be pressed into the internal taper of the spindle. Even in the case of machine tools of relatively smaller sizes it is difficult, during the operation of the insertion or installation of the mandrel, to secure the mandrel with one hand against any unintentional falling out of the spindle until the thread of the draw-rod engages the thread of the mandrel. In the case of machine tools of relatively larger dimensions it becomes even necessary to use another operator, who will either attend to securing the mandrel from falling out or to the operation of establishing the threaded connection of the mandrel with the draw rod. The same difficulties arise also in connection with the release or removal of the mandrel from the spindle, in which case the mandrel must be prevented from slipping out of the spindle after it has been freed from the operative connection with the draw rod.

An installation is known already in the prior art which assumes the function of temporarily securing the mandrel against falling or slipping out. This prior art device consists essentially of two half-shells which grip around the front end of the spindle and which are held together by a suitable spring force. The half-shells are thereby secured axially by an annular groove provided along the periphery of the spindle, into which they engage by means of a flange provided on the rear end of the half shells. The annular flange formed by the half-shells in front of the forward spindle end serves to retain the mandrel, which has not yet been secured within the spindle, in the axial direction at the mandrel flange normally provided for taking up the rotational forces, and thereby effectively secures the mandrel against falling or slipping out.

Other similar prior art devices make use of a screw connection between the retaining member and the machine tool and thereby require partly a special constructional shape for the mandrels to be used.

All known devices of the prior art are thereby supplied as accessories to the machine tools and entail the disadvantage that, apart from the mandrel to be changed, one or several additional parts have to be handled and assembled on the machine tool.

The present invention obviates these disadvantages encountered with the prior art devices by arranging a projection at the machine within the region of the spindle thereof, which projection is displaceable with respect to the spindle axis, in such manner that in the working or operational position thereof the projection is located a slight distance axially in front of the flange of the mandrel and is moved from the working position into the rest or non-operational position thereof in order to enable removal of the mandrel from the spindle or insertion of the mandrel into the spindle. According to one feature of the present invention, this projection is advantageously constituted by a disk mounted eccentrically on the front end of the headstock of the machine tool, the axis of rotation of this disk being arranged vertically above the spindle axis and in parallel therewith so that the disk normally tends to assume the working position thereof owing to its own weight.

Accordingly, it is an object of the present invention to provide an arrangement facilitating the exchange of mandrels or the like by extremely simple means and with complete safety to the parts during the installation and removal operations.

It is another object of the present invention to provide a machine tool with means eliminating the danger for the removable parts used in transmitting torque from dropping or slipping out accidentally during the installation and removal thereof.

A still further object of the present invention resides in the provision of a device facilitating insertion and removal of torque transmitting detachably secured elements in machine tools which are relatively simple, inexpensive and easy to handle, even by inexperienced operators.

Still another object of the present invention resides in the provision of means obviating the necessity of auxiliary personnel or components to enable the installation of removable torque transmitting parts such as spindles or the like in machine tools without additional help either in the form of extra personnel or complicated and expensive accessories.

These and other objects, features and advantages of the present invention will become more obvious from the following description when taken in connection with the accompanying drawing which shows, for purposes of illustration only, one embodiment in accordance with the present invention and wherein:

FIGURE 1 is a vertical cross-sectional view through a part of the headstock of the machine tool according to the present invention, and FIGURE 2 is a front elevational view of the headstock of FIGURE 1.

Referring now to the drawing wherein like reference numerals are used throughout the two views thereof to designate corresponding parts, reference numeral 2 designates therein the spindle which is rotatably mounted in any conventional manner within the headstock 1 of a machine tool. The spindle 2 is tapered internally at 4 for the purpose of centering the tool holder which in the instant case is the mandrel 6. The mandrel 6 is provided with an external taper 8 complementary to taper 4 and with a flange 10 absorbing or taking up the rotational forces. The axial groove 12 in the flange 10 and the block 16 secured within recess 14 of the spindle 2 serve for purposes of transmitting the rotational forces or torque between spindle 2 and mandrel 6. The mandrel 6 is provided at the rear end thereof with an externally threaded pin 18 which is adapted to be screw-threaded into the female thread provided in the draw rod 20 so that by tightening this screw-thread connection the mandrel 6 is pulled against the spindle 2 and is thereby centered with respect thereto. The securing or retaining disk 26 is rotatably mounted in the casing 22, which is detachably secured to the headstock 1 at the front end thereof, by means of the eccentric bearing pin 24. The disk 26 is secured against axial displacement with respect to casing 22 by means of the retainer disk 28, which is secured to the pin 24 in any suitable manner, for example, by means of screws or bolts 38 which are screwed into appropriate threaded bores provided in the rear part of pin 24 while casing 22 is removed from the headstock 1. In the position illustrated in FIGURE 1, the disk 26 is disposed a slight distance axially in front of the flange 10 of the mandrel 6. For the purpose of inserting the mandrel 6 into the spindle 2 or withdrawing it therefrom, the disk 26 is rotated about the axis of the bearing pin 24 until the overlap of the mandrel flange 10 by the disk 26 as this shown in FIGURE 2, becomes non-existent. For that purpose, the disk 26 is provided at its periphery with a knurled edge. The disk 26 is held in the rest or non-operational position thereof by means of the spring-loaded detent pin 30 (FIGURE 2) and the recess 32 provided in the retainer disk 28. The rest position of the disk assembly 26—28 is indicated in FIGURE 2 by the dot and dash line which is displaced by 180° with respect to the working position shown in full lines in FIGURES 1 and 2. The securing or retainer device according to the present invention, which is shown and described herein as a rotatable disk, may also be constituted within the scope of the present invention by a slide bar which is displaceable within a direction perpendicular to the spindle axis; in the alternative, the securing or retainer device can also be constituted by a hinged finger pivotally mounted on the headstock 1, for example to be pivotal about an axis parallel or perpendicular to the vertical plane passing through the spindle axis, and provided with suitable detent means for the operating and/or rest position thereof.

The advantage obtainable by the present invention with relatively small outlay and slight expense does not only consist in enabling a change of the tool holder in a more rapid manner and without the use of additional operating personnel or accessories, but, in particular, in the fact that the device is always available at the required place and does not need to be specially assembled or mounted for use whereby less time is spent on preparing for work without detracting from the required care in handling the tool holder.

While I have shown and described one embodiment in accordance with the present invention, it is understood that the same is not limited thereto but is susceptible of many changes and modifications within the spirit and scope thereof and, I, therefore do not wish to be limited to the particular details shown and illustrated herein, but intend to cover all such changes and modifications as are encompassed by the scope of the appended claims.

I claim:

1. A device for use with machine tools which comprise at least one machine tool spindle rotatably mounted in a spindle carrier, said device serving operative to prevent mandrels, collets and similar tool holders from slipping out of the machine tool spindle when the screw connection with the draw rod for securing a mandrel or collet or similar tool holder within the spindle is ineffectual, comprising a tool holder, provided with flange means, a rotatable retainer disk, and means for rotatably and eccentrically mounting said disk on said spindle carrier within the region of said spindle so as to provide an overlap between a portion of said disk and said flange means in a first, working position of said disk in which the disk is located axially in front of said flange means at a small distance therefrom to prevent removal of the tool holder from the spindle and to enable rotary movement of said disk from said first, working position into a second, rest position in which said disk portion is moved out of the path of said flange means to thereby enable insertion of said tool holder into said spindle or removal therefrom.

2. A device according to claim 1, wherein the axis of rotation of said disk is disposed parallel and above the axis of said spindle in such a manner that said disk tends to assume said working position by virtue of its own weight.

3. A device according to claim 2, further comprising detent means for securing said disk in said second position.

References Cited in the file of this patent

UNITED STATES PATENTS

| | | |
|---|---|---|
| 1,563,070 | Brandau | Nov. 24, 1925 |
| 2,583,264 | Herrmann | Jan. 22, 1952 |
| 2,685,823 | Kaiser | Aug. 10, 1954 |